No. 619,077. Patented Feb. 7, 1899.
L. A. HALABURT.
GLUE APPLYING MACHINE.
(Application filed Feb. 26, 1897.)
(No Model.)
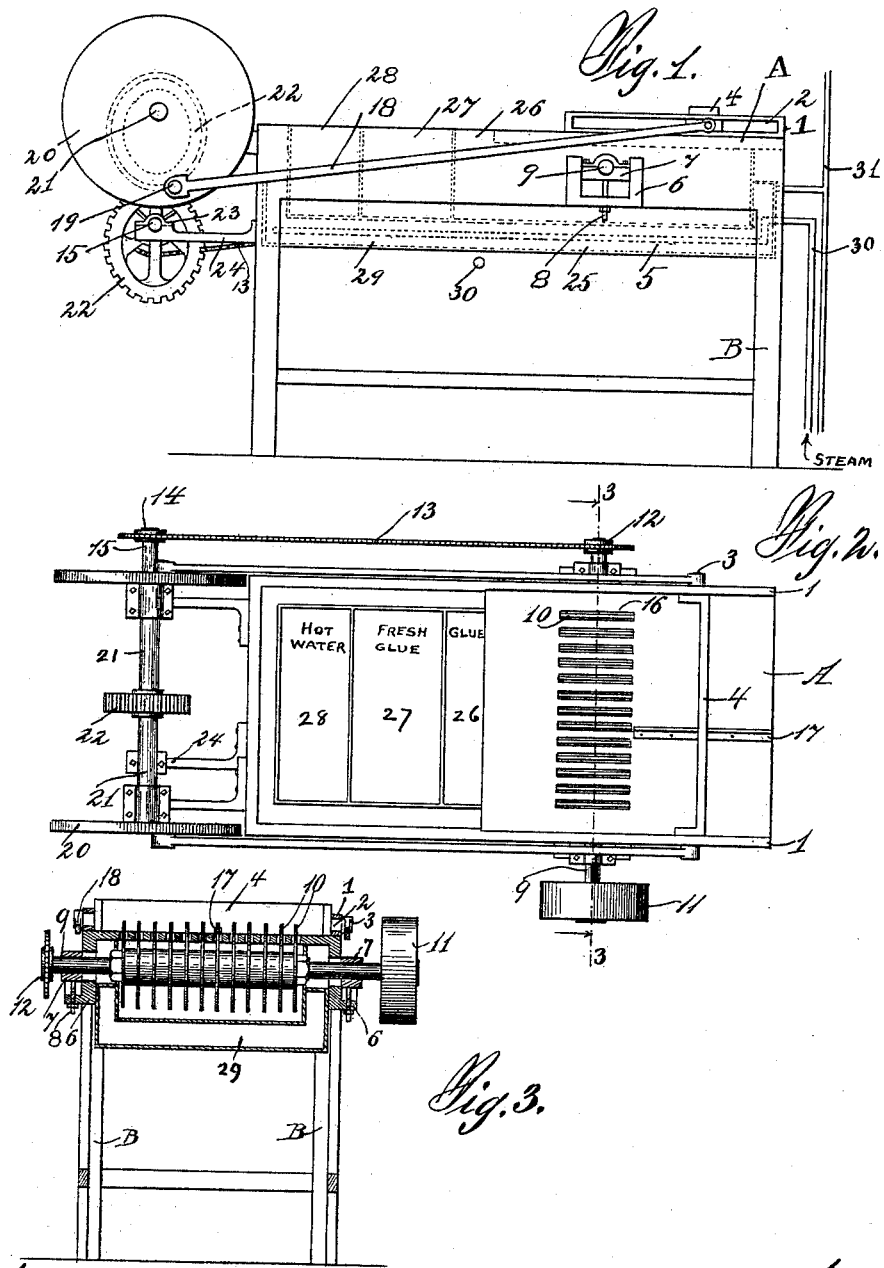

UNITED STATES PATENT OFFICE.

LOUIS A. HALABURT, OF CHICAGO, ILLINOIS, ASSIGNOR TO THE CHICAGO PACKING BOX COMPANY, OF SAME PLACE.

GLUE-APPLYING MACHINE.

SPECIFICATION forming part of Letters Patent No. 619,077, dated February 7, 1899.

Application filed February 26, 1897. Serial No. 625,089. (No model.)

*To all whom it may concern:*

Be it known that I, LOUIS A. HALABURT, a citizen of the United States, residing at Chicago, in the county of Cook and State of Illinois, have invented certain new and useful Improvements in Glue-Applying Machines; and I do hereby declare the following to be a full, clear, and exact description of the invention, such as will enable others skilled in the art to which it appertains to make and use the same.

My invention relates to a novel construction in a machine for applying glue to the dovetail grooves of box sides, the object being to provide a machine of this description which will apply the glue evenly and in a cleanly manner without wasting; and it consists of the features of construction and combinations of parts hereinafter fully described and claimed.

In the accompanying drawings, illustrating my invention, Figure 1 is a side elevation of a glue-applying machine constructed in accordance with my invention. Fig. 2 is a top plan view of the same. Fig. 3 is a vertical sectional view on the line 3 3 of Fig. 2.

My device consists of a plate A, mounted upon a frame B, of any suitable construction, which is provided at each side with upwardly-extending flanges 1, provided with guide-slots 2, in which lugs 3, to which a feeder 4 is secured, are adapted to run. Below said plate A said frame is provided with longitudinal beams 5, upon which are mounted guides 6, in which bearings 7 are slidingly mounted to permit the same to move vertically. Said bearings 7 are mounted upon set-screws 8, by means of which their position is adjusted in accordance with the depth of the dovetail grooves to which the glue is to be applied, as hereinafter more fully described. Revolubly mounted in said bearings 7 is a shaft 9, which carries disks 10 midway between its ends and is provided at one of its projecting ends with a pulley 11, adapted to be geared to a source of power, and at its opposite end carries a sprocket-wheel 12, which is geared by means of a sprocket-chain 13 to a sprocket-wheel 14 on a shaft 15. Said plate A is provided with a series of slots 16, through which said disks 10 are adapted to project, and over which the dovetail grooves to which it is desired to apply the glue pass, so that said disks extend into said dovetail grooves. Said plate A is further provided with a guide-piece 17, by means of which the box sides are adjusted in position, so that the dovetail grooves therein will be brought into position to pass over said disks in the desired manner. Said lugs 3 are connected by means of connecting-rods 18 with crank-pins 19 on wheels 20, mounted upon a shaft 21, running in bearings on the opposite end of said machine from said plate A. Obviously by turning said wheels 20 said feeder 4 will be given a reciprocating motion. This reciprocating motion is made variable by means of eccentric gears 22, one of which is mounted upon said shaft 21 and the other of which is mounted upon said shaft 15, which is mounted in bearings 23 on arms 24, projecting outwardly from said frame B, so as to bring said shaft 15 directly below said shaft 21. It will be obvious that by means of said eccentric gears said wheels 20 will be made to revolve at a varying speed, and I have so arranged said eccentric gears as to cause said feeder 4 to be moved slowly toward and over said disks 10 and move rapidly back to its original position. In this manner it will be obvious that I allow sufficient time for said disks 10 to apply the glue to said dovetail grooves, but cause said box sides to move rapidly back, and thus lose no time in waiting for such rearward movement to be completed. Between said beams 5, and preferably supported thereby, I have mounted a glue-tank 25, which is divided into three compartments 26, 27, and 28. Said compartment 26 is adapted to contain the prepared glue to be applied to said dovetail grooves and is always kept at a depth sufficient to permit said disks to be partially immersed therein, thus obviously causing the same to carry the glue with them throughout their revolution. Said compartment 27 is adapted for the purpose of preparing fresh glue to be fed into said compartment 26, and said compartment 28 is adapted to contain hot water for the purpose of preparing glue. Around the sides and underneath said tank 25 I provide a steam-jacket 29, which is adapted to be fed from a pipe 30, connected with a source of supply of steam, and at its bottom is provided with a stop-cock 30ª, through which the water is adapted to be drawn off. Said steam-jacket is also preferably connected with a pipe 31, which leads to the roof, so as to cause steam from said jacket 25 to pass out of the building through the roof, as it will be obvious that the presence of moisture within the building would be injurious to the lumber.

I claim as my invention—

1. In a glue-applying machine, a table provided with a plurality of slots arranged side by side, a shaft mounted in vertically-movable bearings below said table, a glue-tank below said shaft, a plurality of disks mounted upon said shaft partially immersed in said glue-tank and protruding through slots in said table, gearing between said shaft and a counter-shaft on said machine, a variable-speed gear between said counter-shaft and a crank-shaft, and pitmen connecting said crank-shaft with a reciprocating feeder adapted to feed the material to be glued, over said disks, whereby said feeder is given a variable speed in its forward-and-backward motion, substantially as described.

2. A glue-applying machine comprising a table mounted upon legs and provided with a plurality of parallel longitudinal slots, a glue-tank underneath said table, a shaft mounted in vertically-adjustable bearings extending transversely between said table and said glue-tank, a plurality of parallel disks on said shaft adapted to be partially immersed in the glue in said tank and to project through said slots in said table, a reciprocating-feeder mounted in guides over said table and movable over the slotted portion thereof, a crank-shaft at one end of said table, pitmen connecting said crank-shaft with said feeder, and variable-speed gearing between said crank-shaft and the disk shaft of the machine, substantially as described.

In testimony whereof I affix my signature in presence of two witnesses.

LOUIS A. HALABURT.

Witnesses:
ERWIN J. LOTZ,
RUDOLPH WM. LOTZ.